United States Patent [19]

Gibbons et al.

[11] Patent Number: 5,689,696
[45] Date of Patent: Nov. 18, 1997

[54] METHOD FOR MAINTAINING INFORMATION IN A DATABASE USED TO GENERATE HIGH BIASED HISTOGRAMS USING A PROBABILITY FUNCTION, COUNTER AND THRESHOLD VALUES

[75] Inventors: Phillip B. Gibbons, Westfield, N.J.; Yossi Matias, Potomac, Md.; Andrew Witkowski, Forster City, Calif.

[73] Assignee: Lucent Technologies Inc., Murray Hill, N.J.

[21] Appl. No.: 579,753

[22] Filed: Dec. 28, 1995

[51] Int. Cl.$^6$ ................................................ G06F 17/30
[52] U.S. Cl. .................... 395/601; 395/605; 395/210; 395/760; 364/502; 382/212
[58] Field of Search .......................... 395/77, 603, 612, 395/601, 605, 760; 382/212; 380/14, 2; 364/502, 554

[56] References Cited

U.S. PATENT DOCUMENTS

| | | | |
|---|---|---|---|
| 4,620,286 | 10/1986 | Smith et al. | 395/77 |
| 4,774,681 | 9/1988 | Frisch | 364/554 |
| 4,910,772 | 3/1990 | Matias et al. | 380/2 |
| 5,058,158 | 10/1991 | Matias et al. | 380/14 |
| 5,251,131 | 10/1993 | Masand et al. | 106/822 |
| 5,257,206 | 10/1993 | Hanson | 364/502 |
| 5,361,379 | 11/1994 | White | 382/227 |
| 5,404,509 | 4/1995 | Klein | 395/612 |
| 5,475,813 | 12/1995 | Cieslak et al. | 395/182.02 |
| 5,488,725 | 1/1996 | Turtle et al. | 395/605 |
| 5,519,840 | 5/1996 | Matias et al. | 395/612 |
| 5,524,240 | 6/1996 | Barbara et al. | 395/603 |
| 5,546,502 | 8/1996 | Hart et al. | 395/12 |
| 5,563,982 | 10/1996 | Wang et al. | 395/22 |
| 5,581,704 | 12/1996 | Barbara et al. | 395/200.09 |
| 5,583,950 | 12/1996 | Prokoski | 382/212 |
| 5,596,493 | 1/1997 | Tone et al. | 395/210 |

OTHER PUBLICATIONS

Gibbons et al . "Practical Mantenance Algorithms for High–Biased Histograms Using Probabilstic Filtering", AT&T, pp. 1–17 Oct. 1995.

Flajolet, Philippe "Probabilistic Counting Algorithms for Data Base Applications", Journal of Computer and Systems Sciences, v31, pp. 182–209 1985.

Gibbons et al. "Practical Mantenance of High–Biased Histograms Using Probabilstic Filtering", AT&T, pp. 1–21 Feb. 1996.

Chen et al. "Adaptive Selectivity Estimation Using Query Feedback", UMIACS–TR–93–138, pp. 1–20 Dec. 1993.

Kirschenhofer et al. "How to Count Quickly and Accurately: A Unified Analysis of Probabilistic Counting and Other Related Problems", ICALP '1992.

Ioannidis, Yannis E. "Optimal Histograms for Limiting Worst–Case Error Propogation in the Size of Results", ACM Transactions on Database Systems, v18, No. 4, pp. 709–748 Dec. 1993.

Ioannidis, Yannis "Universality of Serial Histograms", International Conference on Very Large Data Bases, 1993, pp. 257–267 1993.

(List continued on next page.)

*Primary Examiner*—Thomas G. Black
*Assistant Examiner*—Charles Rones
*Attorney, Agent, or Firm*—Katharyn E. Olson

[57] ABSTRACT

A method maintains information associated with items in a database of limited memory which information is used to generate representations of the information such as high-biased histograms. In a first embodiment of the inventive method, information associated with all items with sales above a threshold, together with approximate counts of the items, is maintained. Appropriate choice of a threshold limits the amount of information required to be maintained so as to generate accurate representations of the information with high probability. In a second embodiment of the inventive method, information used to generate a high-biased histogram is maintained within a fixed allotment of memory by dynamic adjusting a threshold which threshold is used to determine a probability with which information is retained in the database.

9 Claims, 4 Drawing Sheets

OTHER PUBLICATIONS

Blekin et al. "Information Filtering and Information Retrieval: Two Sides of the Same Coin?", Communications of the ACM, Dec. 1992, v35, No. 12. p. 29(10) Dec. 1992.

Ramesh et al. "Thresholding based Histograms", IEEE Proceedings-Vision, Image, and Signal Processing, 10-95, v142, No. 5, pp. 271-279 Oct. 1995.

Thakor al. "Multiway Sequential Hypothesis Testing for Tachyarrythmia Discrimination", IEEE Transactions on Biomedical Engineering, May 1994, v41, No. 5, pp. 480-487 May 1994.

Verma et al. "Evaluation of Overflow Probabilities in Resource Management", Supercomm/ICC '92: Discovering a New World of Communications, 1992, pp. 1212-1216.

Markham, K.C. "Comparison of Segmentation Processes for Object Acquisition in Infrared Images", IEEE Proceedings-Part F: Radar and Signal Processing, 2-89, v136, No. 1, pp. 13-21.

Farag et al. "Threshold Selection Based on Histogram Modeling", Systems, Man, and Cybernetics, 1992 International Conference, 1992, pp. 351-356 1992.

Lee et al. "Real-Time Thresholding using Histogram Concavity", Industrial Electronics, 1992 Int'l Symposium, 1992, pp. 500-503 1992.

Keppler, Kay "Falcon Fights Credit Fraud", AI Expert, Mar. 1993, v8, No. 3, p. 56(1).

Y.E. Ioannidis et al., "Balancing Histogram Optimality and Practicality for Query Result Size Estimation," SIGMOD '95.

METHOD FOR MAINTAINING INFORMATION IN A DATABASE USED TO GENERATE HIGH BIASED HISTOGRAMS USING A PROBABILITY FUNCTION, COUNTER AND THRESHOLD VALUES

TECHNICAL FIELD

This invention relates to the field of methods for representing information.

BACKGROUND

A high-biased histogram of a data set is a representation (such as a graphical display or a list) of the most frequently occurring items in the data set. The most frequently occurring items are advantageously determined by a count associated with each item wherein the larger the count, the more frequently occurring the item. See, Y. E. Ioannidis and S. Christodoulakis, "Optimal histograms for limiting worst-case error propagation in the size of join results," *ACM Trans. Database Sys.*, vol. 18, No. 4, pp. 709–748, December 1993. High-biased histograms are important in business operations. For example, a high-biased histogram may be used to represent a list of the top selling items and their count (i.e., amount of sales) for each segment or category of products carried by a business.

Consider a supermarket for which it is desired to keep a list of the top three selling items and their count for the various segments of products carried by the supermarket (e.g., food items, personal care items, cleaning products, housewares, gifts/notions). The list is typically produced using a database system. The database system comprises a database which stores (in memory) information associated with items carried by the business such as identification numbers corresponding to the items and such as counts corresponding to the number of sales of the items. Information in the database is continuously updated with information regarding new sales transactions from point-of-sale terminals located at the checkout lanes of the supermarket. The database system also typically comprises a processing subsystem which processing subsystem can access information in the database to generate a high-biased histogram or other representations of information in the database in response to queries input to the database system. The ability to generate or report high-biased histograms and related statistics is a feature of several commercial database systems (e.g., Dbase II®). However, as discussed below, it is difficult to accurately maintain information used to generate high-biased histograms without reserving an excessive amount of memory for the task.

Consider the problem of maintaining a list of the top three selling items and their count for a segment of a supermarket database system which database system is being updated continuously with new sale transactions. An extreme example of a technique for generating a high-biased histogram would be simply to have for each segment a list of all possible items in the segment and their associated sales or counts. The high-biased histogram could then be generated by simply sorting through the list. However, such an implementation has several drawbacks. First, such an implementation would require a large amount of memory since all items, regardless of count, would be included in the list. Further, systems with large memory are typically expensive and slow to execute operations (since all entries would need to be accessed to generate the high-biased histogram). An alternative technique would be to have all transactions recorded and to periodically sample the transactions (e.g., look at every fifth transaction) to determine the best selling items. Although this technique may increase the speed of operation, the amount of memory for the technique typically remains large so that inaccuracies in the high-biased histogram due to sampling errors are reduced.

At the other extreme, top three lists for a large number of such segments can be implemented using a small amount of memory (e.g., memory which holds information about only three items per segment). Reduced memory or storage requirements typically mean that the database system will be less expensive to purchase and maintain and/or quicker to respond. A reduced memory system could be implemented by having a summary table, T, of size three for a particular segment in a set of segments. Table T contains information associated with the top three selling items such as the count of the number of sales to date for each of the three items in the particular segment. Continuing with the supermarket example from above, let the particular segment be the food items segment, where the three best selling items and their counts at time $t_1$ are listed in Table $T(t_1)$.

TABLE $T(t_1)$

| Item  | Sales |
|-------|-------|
| milk  | 1015  |
| bread | 730   |
| juice | 615   |

If a new transaction arrives at a later time for an item in T, its count is readily updated. However, for items not already in T, there is no additional memory for recording the item and its count. In particular, consider new sales transactions arriving at a later time $t_2$—such as: bread, 50 sales; candy, 400 sales; chips, 200 sales; soda, 450 sales; candy, 400 sales. If information associated with one item is not preempted from existing Table $T(t_1)$, then Table $T(t_2)$ (which is Table $T(t_1)$ updated by the new sales transactions at time $t_2$) fails to embody the fact that recent sales of candy, as for example around Halloween time, have resulted in candy (with sales of 800 units) becoming the second best selling item. Thus, in small memory systems there is a need to decide when an item not in a table has, due to unpredicted trends in recent sales, become one of the top selling items. A variety of rules for making such a decision have been proposed (e.g., always replace the lowest selling item with the most recently sold item, regardless of the count), but the result is typically that the information maintained in the memory will produce an inaccurate high-biased histogram.

Thus, there is a need for a method for maintaining information used to generate data representations, such as high-biased histograms, which method uses a small amount of memory, is able to identify unpredicted trends and which can produce accurate representations.

SUMMARY

In accordance with the present invention it is recognized that information used to generate data representations, such as high-biased histograms, may be maintained using limited memory wherein information is selected for storage in the memory with a probability based on a threshold value. In particular, the method receives information associated with an item for entry into a database, and if the database comprises other information associated with the item, then updates the other information based on the received information. If the database does not comprise other information associated based upon the item, the inventive method adds the information to the database with a probability that is a function of a threshold value. The probability is a probability of success that the information is added to the database.

In a first embodiment of the inventive method, information associated with all items with sales above the threshold is maintained. Appropriate choice of the threshold limits the amount of information required to be maintained and stored. Once the information associated with an item is entered or added, the threshold value can be used to establish an approximate count of the actual sales of the item. The approximate counts of items are used to generate representations of the information, such as high-biased histograms, which representations advantageously have small error with high confidence. In a second embodiment of the inventive method, information is maintained within a fixed allotment of memory by adjusting the threshold value in such a way so as to limit the amount of information stored.

The accuracy of the inventive method is demonstrated for the first embodiment where it is shown that the inventive method yields approximate results for a high-biased histogram that are highly accurate with high confidence, not just in the aggregate sense, but for every single item that should or should not appear in the high-biased histogram.

DETAILED DESCRIPTION

This section is divided into four parts. In the first part, a system in which the inventive method may be practiced is described, and an overview of the inventive method is presented. In the second part, two embodiments of the inventive method are presented. In the third part, an analysis of the first embodiment is presented. This analysis derives a compensation factor used to determine the approximate count of an item in the first embodiment of the inventive method. The analysis describes performance characteristics (i.e., accuracy) of the first embodiment. In the fourth part, other applications of the inventive method are discussed.

A. Overview

Figure 1:
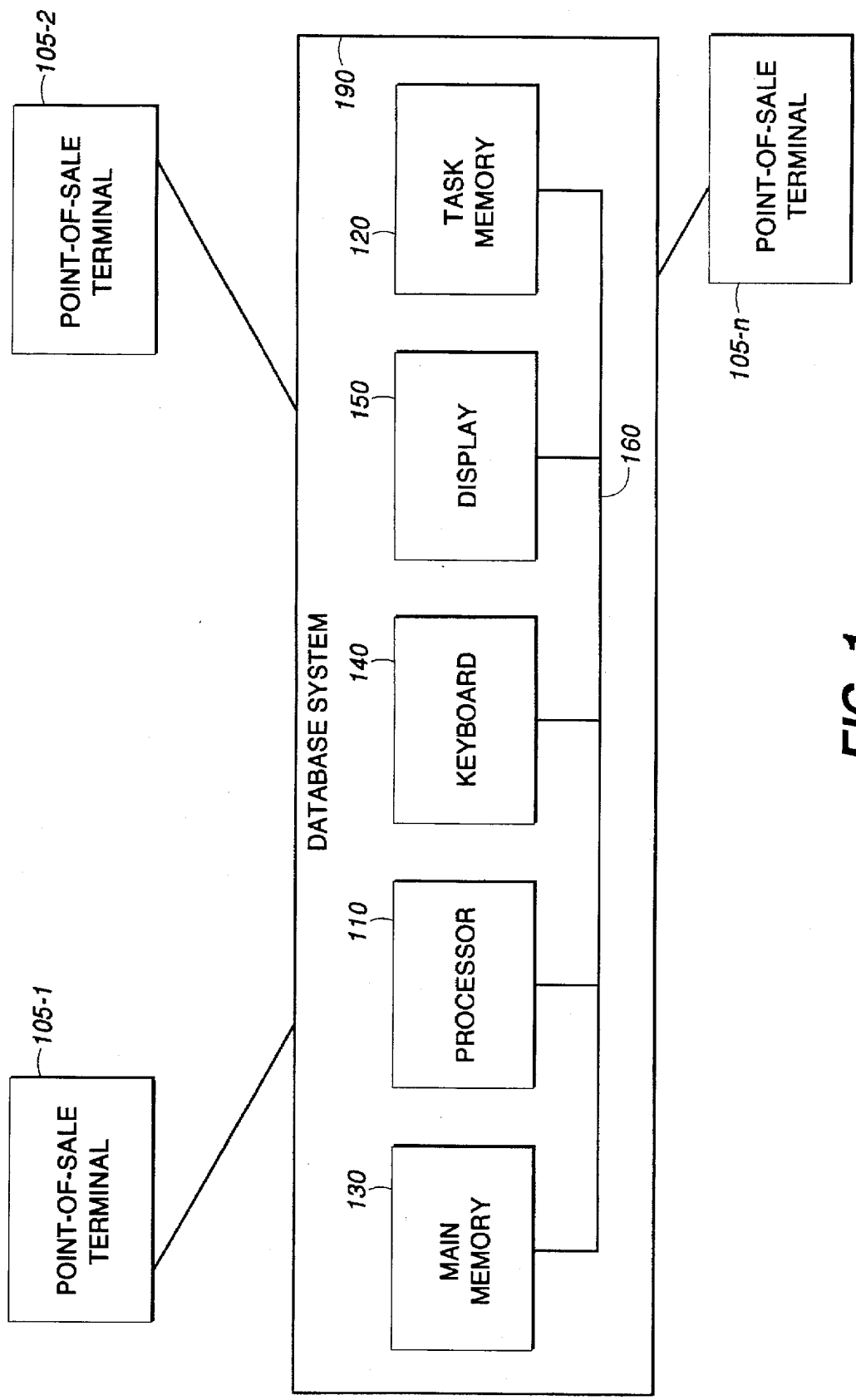
FIG. 1 illustrates a system in which the inventive method may be practiced.

FIG. 1 illustrates a centralized system for monitoring transactions in a retail establishment, as for example in a supermarket, in which the inventive method for maintaining information for generating high-biased histograms and other data representations using limited task memory may be practiced. The system comprises a set of n point-of-sale terminals 105-j, j=1,2, . . . n. In the system of FIG. 1, point-of-sale terminal 105-j is an electronic cash register located at a checkout aisle in the supermarket. Each one of point-of-sale terminal 105-j is connected to database system 190, and information regarding transactions executed at each point-of-sale terminal 105-j is input to system 190.

Database system 190 comprises processor 110 and task memory 120. Processor 110 advantageously updates information in task memory 120 based on input received from point-of-sale terminals 105-j, and processor 110 accesses task memory 120 to respond to queries from users regarding information stored in task memory 120. Task memory 120 is advantageously implemented using a medium for storing information, such as a floppy disk, hard drive, random access memory, etc. Database system also advantageously comprises other components such as memory 130, keyboard 140 (useful for inputting queries from users) and display 150 (for rendering representations of information derived from task memory 120). Processor 110, task memory 120, memory 130, keyboard 140 and display 150 are connected together by bus 160. Database system 190 may be implemented using a personal computer and appropriate peripheral devices. The inventive method may also be implemented in a distributed system in which components of the distributed system (e.g., memory and processors) are networked together.

Figure 2:
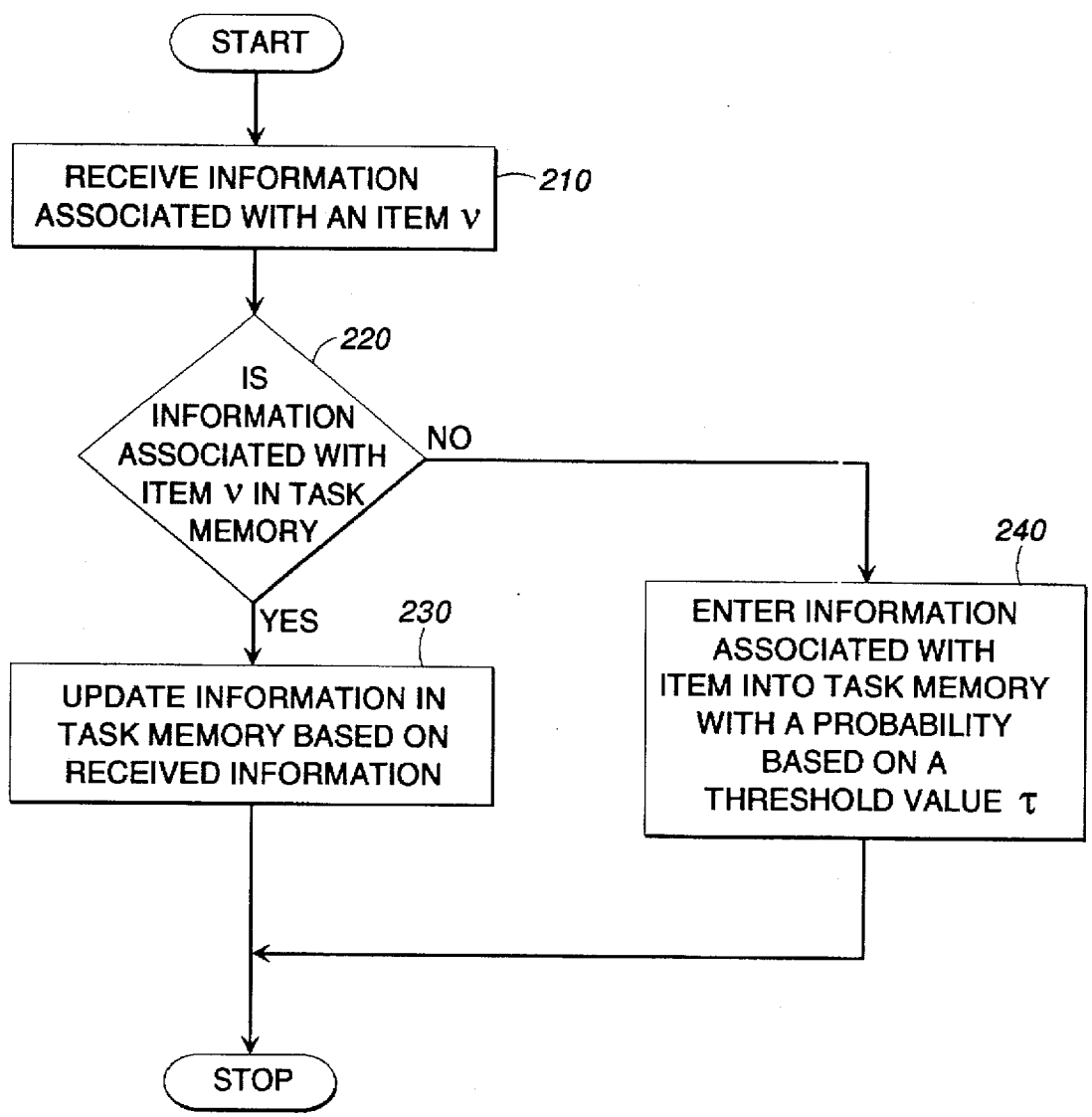
FIG. 2 illustrates steps in the inventive method.

FIG. 2 illustrates steps in the inventive method for maintaining information used to generate data representations (such as high-biased histograms) in limited memory (e.g. in task memory 120). The motivation for limiting the memory is to reduce the expense of the database system and/or to increase the speed at which the database system is able to respond to queries from users. As noted above, the difficulty of maintaining high-biased histograms in limited memory is that inaccuracies (such as a failure to identify items that selling well due to unpredicted trends) may result. The inventive method overcomes this difficulty by storing the information based upon a probability that is a function of a threshold value. Thus, the threshold value serves as a "probabilistic filter" to the incoming information so that with a probability that is a function of the threshold value, information will be stored, i.e., the information will pass through the probabilistic filter and be stored. Proper selection of the threshold value ensures that frequently selling items (e.g., trend items) are identified with high confidence.

FIG. 2 illustrates steps in the inventive method. Let a database comprise information associated with items (e.g., a table or a list of the items and their associated counts). In step 210 information associated with an item v is received (e.g., new sales of the item). In step 220, it is determined if information associated with the item is already in the table. If the information associated with the item is in the table, then the information associated with item v is simply updated in step 230 (e.g., the count is increased to reflect the new sales). If information associated with the item is not in the table, then in step 240, the information associated with the item is entered into the table with a probability based on a threshold value, $\tau$. The decision whether to enter the information in the database may be implemented (i.e, the outcome of the probabilistic filtering may be determined) by using a random number generator function (such as those available on many computers) to generate a number, $\chi$, between 0 and 1. If the generated number is above $1/\tau$, then information is not entered into the table. If the generated number is below $1/\tau$, then the information is entered into the table.

Consider a specific example of the inventive method in the context of the supermarket example above. Suppose, for example, the threshold value $\tau$ is advantageously set to $1/1000$. As new information regarding the sale of an item arrives from a point-of-sale terminal, if information already associated with the item is already in the table, its sales count is adjusted (i.e., increased by one) based on the new information. If information associated with the item is not in the table, the new information is added to the table with probability $1/1000$. Intuitively, one can expect to see an item 1000 times before information associated with it gets added to the table. When new information for an item is entered into the table, its count is advantageously set to be a function of the threshold value, e.g., the count is set to 1000. Thus, although no counts other than those in the top three are recorded, the threshold value can be used to assign counts to newly added items.

B. Embodiments of the Inventive Method

Method 1: Fixed threshold and dynamically adjusted task memory usage

In this embodiment of the inventive method, information regarding all items with approximate count (sales) above a threshold value is maintained with high confidence. A high-biased histogram can be obtained by extracting information associated with items having the highest approximate counts. The threshold value for inserting an item into a task memory in the first embodiment is designated as $\tau$, and $\tau$ is kept fixed. The size of the task memory, M, is adjusted dynamically to accommodate all information associated with items selected for insertion into the task memory. If the threshold is sufficiently high, M will be small as is desirable.

Figure 3:
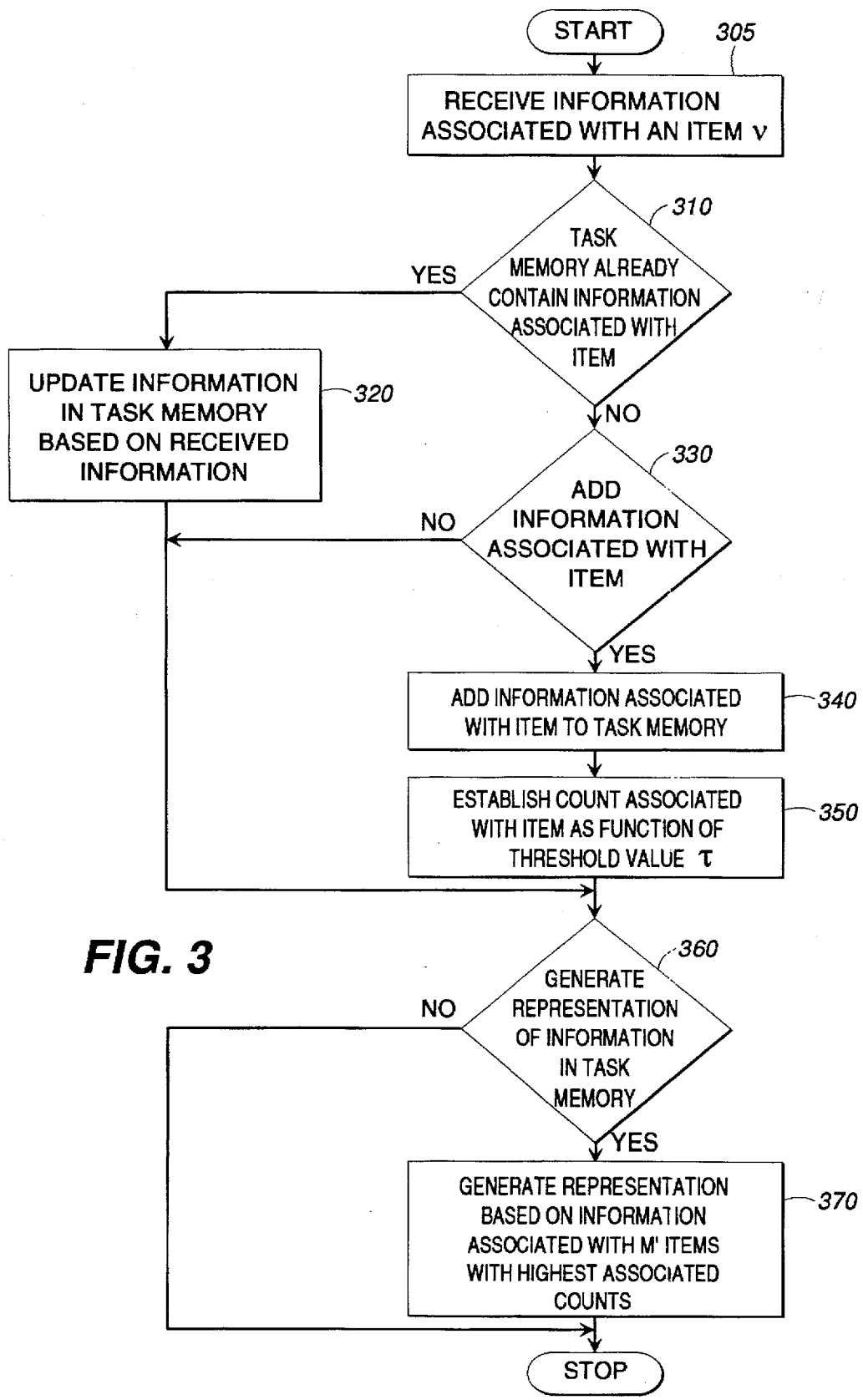
FIG. 3 illustrates steps in a first embodiment of the inventive method.

The steps in the first embodiment of the inventive method are shown in FIG. 3. In step 305 information associated with an item v is received (advantageously at a database system). In particular, consider the case where the information indicates the sale of item v. In step 310 the task memory is checked to determine if information associated with item v appears in the task memory. If it does, then information in the task memory is updated based on the received information in step 320 (e.g., the count associated with item v is increased). If information associated with v is not in the task memory, then a decision is made in step 330 as to whether to add the information associated with v to the task memory. In particular, the information associated with v is added to the task memory with probability $1/\tau$. If the decision to add is successful, the information is added in step 340. The value of $\tau$ is advantageously fixed throughout operation of the method. In case of failure, the information is ignored and the task memory remains unchanged (i.e., the "no" branch of the decision in step 330 is taken). In the case of success, the information associated with the item is used to update the task memory in step 340. In particular, an approximate count associated with the new item is advantageously selected or adjusted in step 350 to be $1+c'$, where $c'=418\tau-1$ (as shown below). The new count serves to compensate for previous, unsuccessful, attempts to introduce the information into the task memory. When information associated with a new item is entered, the number of items in the task memory, M, is increased by 1.

The above specific example considered the case where information input to the task memory corresponded to an increase of one in the number of occurrences of sales of an item. The more general scenario (which also follows the steps in FIG. 3) is one in which each update of information to the task memory corresponds to a greater number of increases in the sale of a particular item (i.e., the update, rather than being about one sale of an item, is about a larger number of sales of the item). For example, an update to a sales task memory may comprises information about both an item number, $\chi$, and a quantity, w, indicating that w items were sold for item number $\chi$. This scenario is the weighted updates scenario, where the quantities are the weights.

A weighted update with weight (i.e., quantity) w can be treated as w updates of weight 1. However, when w is large, this approach would be quite slow. Treating such an update as w separate updates could require up to w sequences of probabilistic filtering, until either the value is in the task memory or all w attempts to add the information to the task memory had failed. Instead, it is advantageous to make one decision or to perform one probabilistic filtering step so that the probability of inserting the information into the task memory is the same as if w attempts were made. In particular, if the information associated with the item is not in the task memory and $\tau$ is the fixed threshold value then:

Prob(not inserted in w tries)=$(1-1/\tau)^w$

Thus for items with weight w, the information associated with the item is inserted in the task memory with probability $1-(1-1/\tau)^w$. The count associated with the item is set to $w+c'$, where $c'$ is as given above. For items already in the task memory, w is simply added to its current count.

In step 360, it is determined whether to generate a representation, such as a high-biased histogram, based on the information in the task memory. Consider the values and approximate counts associated with the M entries of the task memory after any sequence of information arrivals. The higher the approximate count relative to the fixed threshold value $\tau$, the more accurate the result. A high-biased histogram for M'<M items is obtained (in step 370) by extracting from the task memory, based on the information stored therein, identification of the M' items with the highest approximate counts, as long as the approximate counts are at least $\tau$. If no item has an approximate count greater than or equal to $\tau$, the task memory advantageously reports that, based on the information, no items have counts above $4\tau-c'+1=3.582\tau$. This assertion will be correct with 95% confidence (based on the analysis presented below).

Method 2. Fixed task memory allotment and dynamically adjusted threshold

The above approach of the first embodiment serves as the basis for a second embodiment of the inventive method in which an approximate high-biased histogram of the top selling items, together with their approximate counts, is generated based on information maintained in a task memory using no more than a specified amount of memory (e.g., the memory allotment is fixed or the database is of a fixed size and a maximum amount of information can be maintained). The threshold is dynamically adjusted as needed so as to ensure that the size of the task memory does not exceed the specified amount. In this embodiment, a block of memory for a task memory of up to M entries is available, where M is fixed.

Figure 4:
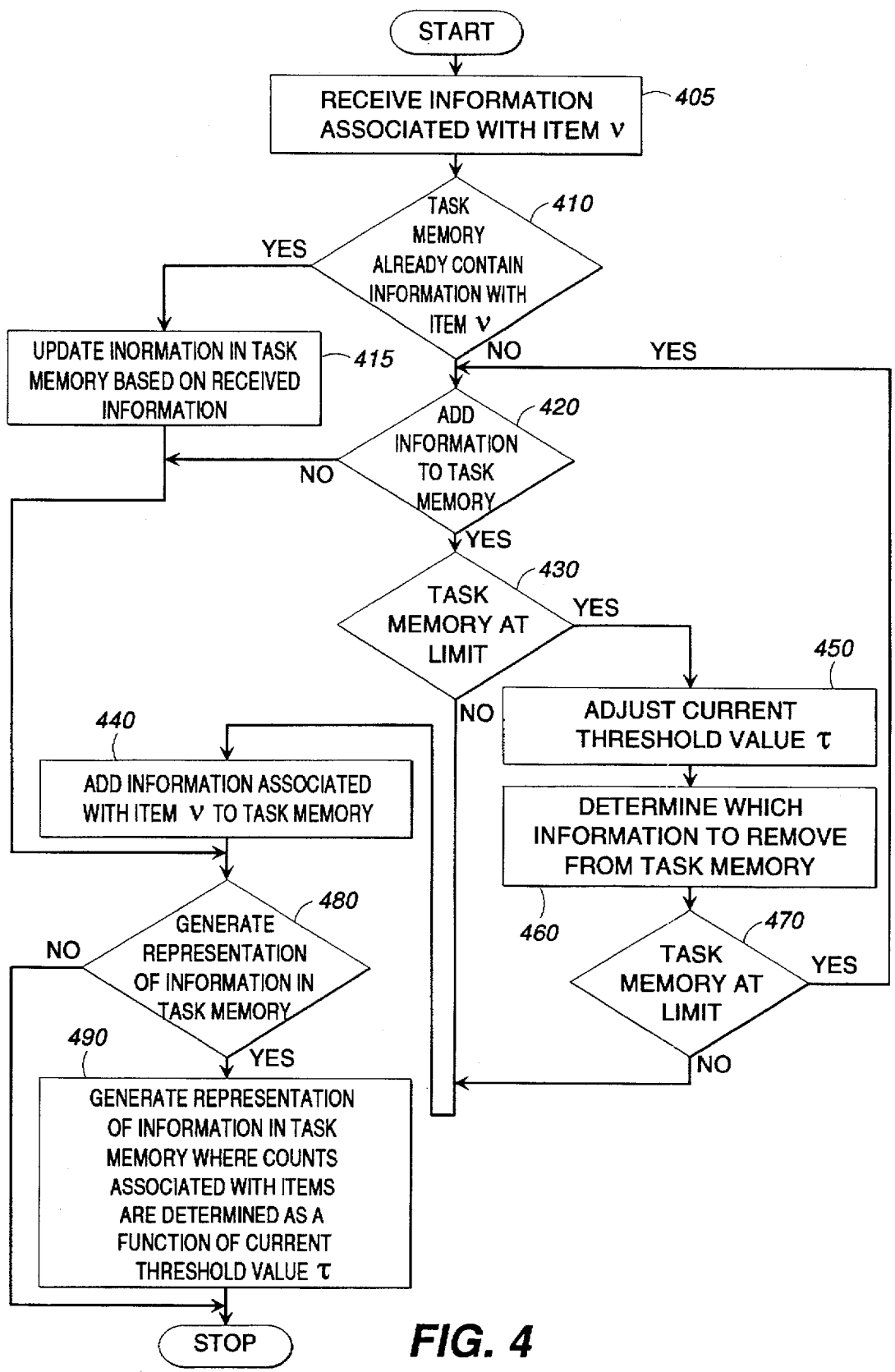
FIG. 4 illustrates steps in a second embodiment of the inventive method.

FIG. 4 illustrates steps in the second embodiment of the inventive method. The observed count is maintained for every item having associated information in the task memory. The observed count is the sum of the weights since information associated with an item was first inserted in the task memory (i.e., it does not include the compensation c' discussed above). The method proceeds in steps 405–415 as in the fixed threshold value case (Method 1 above. However, once the task memory is full, there will be a need to decide which information to remove so that other information may be added (e.g., so as to detect unpredicted trends).

Accordingly, in step 420 the method determines whether to add received information associated with an item into the task memory. The decision is made (advantageously using the above-described random number generator function) such that the probability of success is $1/\tau$ where $\tau$ is the current threshold value. If is it decided not to add the information, step 480 (described below) is executed. If the information is to be added, in step 430 the method checks to ensure that the task memory is not at its specified limit. If the task memory is not at its limit, the received information is added (step 440), and then step 480 is executed. However, if the task memory is at its limit, the current threshold value is adjusted (updated) in step 450. In step 460, the inventive method determines which information associated which items is to removed or deleted from the task memory. The determination is based on the (adjusted) current threshold value.

One technique for determining which information to remove is to update the current threshold value based on the count associated with item in the task memory having the next-to-lowest count, and the information associated with the item having the lowest count is removed. Although this technique is straightforward, the technique may create dependencies between items that result in less accurate histograms because the updated threshold applies only to information associated with subsequent items. As the threshold is raised, it becomes more and more difficult for information associated with subsequent items to enter the task memory, whereas information already in the task memory that was entered when the threshold was low and only have to stay ahead of the lowest count.

To enable more uniform treatment of all information in the inventive method, regardless of the order in which it is received, the information associated with all items in the task memory is advantageously subject to further probabilistic filtering in step 460 whenever the threshold is adjusted. In particular, whenever the limit of the memory allocated for the information in the task memory is reached, the threshold is advantageously adjusted in step 450. All the information associated with each item in the task memory is examined, and the information associated with each item v retained in the task memory with a certain bias or probability of success ($P'_v$ defined below) that is a function of the adjusted threshold. The bias ensures that information associated with each item is kept or discarded from the task memory with an appropriate probability based on the item's count.

Consider the first time the task memory becomes full and the threshold advantageously is to be raised. Let $\tau_1$ be the initial threshold and let $\tau_2$ be the new threshold. Any information associated with item v in the task memory entered the task memory by being selected based upon a probability of success $$p_v = 1 - (1 - 1/\tau_1)^{w_v}$$

where $w_v$ is the weight of the item when it was inserted. Let $c_v \leq w_v$ be the current observed count for v. The goal is to treat information associated with item v as a new arrival of weight $c_v$ with the new threshold value, but then factor in the fact that information associated with v was already entered with bias $p_v$ and succeeded. Thus, $p'_v$ is selected such that $$p_v \cdot p'_v = 1 - (1 - 1/\tau_2)^{c_v}$$

For example, if $w_v = c_v = 1$, then $p_v = 1/\tau_1$ and $1-(1-1/\tau_2)^{c_v} = 1/\tau_2$, the information associated based upon item is entered into the task memory with bias or probability of success $p'_v = \tau_1/\tau_2$. If it succeeds, it succeeds with probability $(1/\tau_1)(\tau_1/\tau_2) = 1/\tau_2$ as desired.

In general, the inventive method keeps track of a success probability $p_v$ for each entry in the task memory. The inventive method raises the threshold from $\tau_i$ to $\tau_{i+1}$ by retaining information associated with each item v in the task memory based upon a probability of success $$p'_v = \frac{1 - \left(1 - \frac{1}{\tau_{i+1}}\right)^{c_v}}{p_v}$$

If it succeeds, the information associated with the item is kept in the task memory and $p_v$ is updated to be $p_v \cdot p'_v$ in preparation for the next time the threshold value is raised. Note that if $p_v$ is less than or equal to the goal probability (so that $p'_v \leq 1$), then no probabilistic filtering is needed: the information remains in the task memory and $p_v$ is unchanged. In both cases, the observed count associated with any item v kept in the task memory remains $c_v$. The task memory is again examined (step 470), and if not full, step 440 is executed. If the task memory is full, the method advantageously returns to step 420.

There is flexibility in the inventive method for selecting the respective threshold values, $\tau_1, \tau_2, \ldots \tau_K$ (e.g., the threshold value can be increased by a fixed percentage amount each time or the threshold value can be increased as a function of the count associated with lower count items). The goal is to select threshold values that result in a nearly full task memory: too large a threshold will eliminate all but a small amount of information, while with too small a threshold, the task memory soon becomes full again requiring additional filtering. If the task memory is nearly full during the entire method (after an initial fill), then the observed counts have an opportunity to accumulate, which results in higher accuracy. In fact, the quality of an observed count typically depends on the magnitude of the threshold at the point when the associated information transitioned into the task memory for the last time.

Consider the observed counts remaining in the M entries of the task memory after any sequence of information arrivals, and let $\tau_j$ be the current threshold value. If a representation of information in the task memory is to be generated (i.e., the "yes" branch of step 480 is taken), step 490 in the inventive method is executed. In step 490 the approximated counts for each item having associated information in the task memory are obtained by adding $c' = 0.418\tau_j$ to each observed count. The higher the approximate count relative to $\tau_j$, the more accurate the result. A high-biased histogram for M'<M values is obtained by extracting the M' values from the task memory with the highest approximate counts, as long as these approximated counts exceed $\tau_j$.

C. Analysis of Method 1

This section presents a derivation of the quantity $c'$, which as used above, is a compensation factor that is added to the observed counts, in order to account for occurrences of a value prior to its insertion into the table. This section also discusses the accuracy of high-biased histograms generated by Method 1.

The analysis below demonstrates performance guarantees on the quality of the histograms, regardless of the arrival sequence. For each item v, let $m_v$ be the actual (i.e., exact) count for v (i.e., the sum of the weights over all arrivals for value v). The analysis shows that, for any sequence, the following desirable properties hold:

1. The popular values are in the table: Any value with actual count $m_v \geq \alpha\tau$, where $\alpha > 0$, will be in the table with probability at least $1 - 1/e^\alpha$. Thus, for example, if $m_v \geq 3\tau$, then the value is in the table with at least 95% probability.

2. The approximate counts of popular values are quite accurate: The approximate count of any value v with actual count $m_v$ is, for all $\alpha > 0$, in $[m_v - \alpha\tau, m_v + 0.418\tau - 1]$ with probability at least $1 - 1/e^{\alpha + 0.418}$. Thus, for example, if $m_v \approx 5\tau$ then its approximate count is within a factor of 2 with 95% probability, and if $m_v \geq 52\tau$ then its count is within 5% with 95% probability.

3. The unpopular values are either not in the table or have small approximate counts: Any value with approximate count at least $\alpha\tau$, for $\alpha \geq 1$ must have actual count $m_v > (\alpha - 0.418)\tau$. Thus, for example, no value with actual count $m_v \geq 0.582\tau$ will have an approximate count greater than or equal to $\tau$.

Turning now to the analysis, for a given entry threshold $\tau$, an item can be expected to be seen $\tau$ times before it is inserted in the table. The goal is to account for these "unrecorded" occurrences by adding some compensation factor $c'$ to the observed counts in a manner that leads to high quality histograms.

Consider the fixed threshold scenario such that all new items correspond to one new occurrence of some item (i.e. all weights are 1). For each item v, let $m_v > 1$ be its number of occurrences. By the fixed threshold algorithm, each item whose associated information is not in the table is added to the table with probability $1/\tau$. Upon the first insertion of information associated with item v into the table, item v is assigned a count which is 1 plus the compensation value $c' = c'(\tau)$, to be determined below. This count is incremented by 1 for each subsequent occurrence of v.

Let $c_{84}$ be the observed count for v, i.e., the number of occurrences of v including and subsequent to the occurrence of v that puts information associated with v in the table. Let $Est_v$ be the approximate count of v after the last occurrence of v; $Est_v = c' + c_v$. The value $c'$ will be selected so that $Est_v$ will be close to $m_v$.

In particular, if E is the expected value operator, then $$E(Est_v | v \text{ in table}) = m_v.$$

Then $$E(Est_v | v \text{ in table}) = E(c_v | v \text{ in table}) + c' =$$

$$c' + \sum_{i=1}^{m_v} (m_v - i + 1) \cdot \text{Prob}(v \text{ inserted at ith occurrence} | v \text{ in table}) =$$

$$c' + \sum_{i=1}^{m_v} (m_v - i + 1) \cdot \text{Prob}(v \text{ inserted at ith occurrence} \cap v \text{ in table})/\text{Prob}(v \text{ in table}) =$$

$$c' + \sum_{i=1}^{m_v} (m_v - i + 1) \cdot \text{Prob}(v \text{ inserted at ith occurrence})/\text{Prob}(v \text{ in table}) =$$

$$c' + \sum_{i=1}^{m_v} (m_v - i + 1) \cdot \left( \frac{\left(1 - \frac{1}{\tau}\right)^{i-1} \cdot \frac{1}{\tau}}{1 - \left(1 - \frac{1}{\tau}\right)^{m_v}} \right) =$$

$$c' + \frac{1}{\tau \left(1 - \left(1 - \frac{1}{\tau}\right)^{m_v}\right)} \cdot \sum_{i=0}^{m_v - 1} (m_v - i) \left(1 - \frac{1}{\tau}\right)^i.$$

Let $q = 1 - 1/\tau$. Assume $m_v \geq 2$. (The case for $m_v = 1$ is straightforward.) Then $$\sum_{i=0}^{m_v-1} (m_v - i) q^i = m_v(1 + q + q^2 + q^3 + \ldots + q^{m_v-1}) -$$

$$(q + 2q^2 + 3q^3 + \ldots + (m_v - 1)q^{m_v-1})$$

$$= m_v \cdot f(q) - q \cdot g(q),$$

where $$f(q) = 1 + q + q^2 + q^3 + \ldots + q^{m_v-1} = (1 - q^{m_v})/(1 - q)$$

and $$g(q) = 1 + 2q + 3q^2 + \ldots + (m_v - 1)q^{m_v - 2}$$

is the derivative of f(q) with respect to q. Thus $$g(q) = f'(q) = (1 - q^{m_v})/(1 - q)^2 - (m_v q^{m_v - 1})/(1 - q).$$

Plugging in and simplifying using the fact that $1 - q = 1/\tau$ and $q/(1-q) = \tau - 1$, then $$E(Est_v | v \text{ in table}) = c' + \frac{1}{\tau(1 - q^{m_v})} \cdot \left( \frac{m_v(1 - q^{m_v})}{1 - q} - \frac{q(1 - q^{m_v})}{(1-q)^2} + \frac{m_v q^{m_v}}{1 - q} \right)$$

$$= c' + m_v - \tau + 1 + \frac{m_v q^{m_v}}{1 - q^{m_v}}.$$

Thus, to have $E(Est_v | v \text{ in table}) = m_v$, it is required $$c' = \tau - 1 - m_v \frac{q^{m_v}}{1 - q^{m_v}} \approx \tau - 1 - m_v \frac{(1/e)^{m_v/\tau}}{1 - (1/e)^{m_v/\tau}} =$$

$$\tau - 1 - \frac{m_v}{e^{m_v/\tau} - 1},$$

where the fact that $(1 - 1/\tau)^\tau$ is very close to $1/e$ for all $\tau > 10$ has been used.

Since $c'$ depends on $m_v$, which is unknown, $c'$ is selected so as to compensate exactly when $m_v = \tau$. Thus $$c' = \tau - 1 - \frac{\tau}{e - 1} = \tau \left( 1 - \frac{1}{e - 1} \right) - 1 =$$

$$\tau \left( \frac{e - 2}{e - 1} \right) - 1 \approx .418 \cdot \tau - 1.$$

This value of $c'$ is used as a heuristic in the inventive method for scenarios with arbitrary weights and adjusting thresholds. In the latter case, $c'$ is added to the observed counts only to calculate the approximate counts, and not as part of the procedure to maintain the histograms. If $\tau_k$ is the current threshold at the time the approximate counts are calculated, then $c' = 0.418 \cdot \tau_k - 1$.

Performance guarantees of the first embodiment of the inventive method are now considered. The first lemma shows that the popular values are likely to be in the table at any point in the Method 1 embodiment. Recall that items arrive with positive integer weights, and that the actual count $m_v$ of an item v is the sum of the weights.

Lemma 1 Consider the Method 1 embodiment, and let $\tau$ be the threshold. Any item v whose actual count thus far is $m_v \geq \alpha \cdot \tau$, where $\alpha > 0$, will be in the table with probability $\geq 1 - 1/e^\alpha$.

Proof. Let k be the number of kerns thus far with value v, and let $w_1, w_2, \ldots, w_k$ be the weights associated with these occurrences. Thus $$\sum_{i=1}^{k} w_i = m_v.$$

The probability that v fails to be inserted in the table is $$\left(1 - \frac{1}{\tau}\right)^{w_1} \cdot \left(1 - \frac{1}{\tau}\right)^{w_2} \cdots \left(1 - \frac{1}{\tau}\right)^{w_k} =$$

-continued $$\left(1-\frac{1}{\tau}\right)^{m_v} \leq \left(1-\frac{1}{\tau}\right)^{\alpha\tau} \leq (1/e)^{\alpha}.$$

Hence, if $m_v \geq 3 \cdot \tau$ then with 95% confidence v will be represented in the table.

The next lemma presents confidence bounds for the accuracy of the approximated counts at any point in the Method 1 embodiment.

Lemma 2 Consider the Method 1 embodiment, and let $\tau$ be the threshold. Let $Est_v$ be the approximate count of an item v whose actual count thus far is $m_v$. Then for all $\alpha > 0$, $Est_v \in [m_v - \alpha \cdot \tau, m_v + 0.418 \cdot \tau - 1]$ with probability $\geq 1 - 1/e^{\alpha + 0.418}$.

Proof. Let $c_v$ be the observed count for v. The upper bound on $Est_v$ follows from the fact that $Est_v = c_v + c' = c_v + 0.418 \cdot \tau - 1 \leq m_v + 0.418 \cdot \tau - 1$. As for the lower bound, Lemma 1 implies that, with probability $1 - 1/e^{\alpha + 0.418}$, the value will be in the table no later than the point where its actual count first equals or exceeds $(\alpha + 0.418)\tau$. Thus at most $((\alpha + 0.418)\tau - 1$ are unobserved, and hence $$Est_v = c_v + c' \geq m_v - (\alpha + 0.418)\tau + 1 + c' = m_v - \alpha\tau.$$

Corollary 1 Consider the Method 1 embodiment, and let $\tau$ be the threshold. If $Est_v$ is the approximate count of an item v, then the actual count is in $[Est_v - 0.418 \cdot \tau + 1, Est_v + 2.582 \cdot \tau]$ with 95% probability.

D. Conclusion

The disclosure decries a method and apparatus for maintaining information used to generate data representations such as high-biased histograms. The method uses a probabilistic filtering technique which enables accounting for adding information into a task memory which information is used to generate high-biased histogram table without keeping explicit track of all counts associated with the information. The first embodiment of the inventive method allows information associated with every item whose count is above a certain fixed threshold to be represented in the histogram with high probability. The memory requirement for the first embodiment depends on the number of items meeting the threshold. The second embodiment is based on the first. The second embodiment maintains a high-biased histogram with a fixed amount of memory. The threshold for entry of an item in the second embodiment is adjusted so as to maintain the fixed amount of task memory. The inventive method can be applied to other applications as, for example, in generating high-biased histograms in which a bias in count is given to more recently entered and updated information.

The method disclosed herein has been described without reference to specific hardware and software. Instead, the method has been described in such a manner that those skilled in the art can readily adapt such hardware and software as may be available or preferable for a particular application.

What is claimed is:

1. A method comprising the steps of:
   receiving information associated with an item for entry into a database, and
   if said database comprises other information associated with said item, then updating said other information based on the received information, and if said database does not comprise other information associated with said item, then adding said information to said database based upon a probability that is a function of a threshold value.

2. The method of claim 1 wherein said probability is a probability of success that said information is added to said database.

3. The method of claim 1, wherein the information associated with said item added to said database comprises a count associated with said item, said method further comprising the step of:
   establishing said count associated with said item in said database as a function of said threshold value.

4. The method of claim 1 wherein said threshold value is a fixed value.

5. The method of claim 1, wherein said database is characterized by a size limit, which size limit determines a maximum amount of information in said database, further comprising the step of:
   adjusting said threshold value if said database is of said size limit.

6. The method of claim 5 further comprising the step of:
   for information associated with each item in said database, retaining information associated with said each item in said database based upon a probability that is a function of the adjusted threshold value.

7. The method of claim 1 further comprising the step of:
   generating a high-biased histogram based on said information in said database, wherein said information comprises count values associated with items in said database, wherein said count value is a function of the threshold value.

8. A method of maintaining information in a database wherein said database can store a maximum amount of information, said method comprising the steps of:
   receiving information associated with an item for entry into a database, and
   if said database comprise other information associated with said item, then updating said other information based on the received information;
   if said database does not comprise said maximum amount of information, then adding said information to said database;
   if said database does comprise said maximum amount of information, then
   a) adjusting a threshold value, and
   b) for information associated with each item in said database, retaining information associated with said each item in said database with a probability that is a function of the adjusted threshold value.

9. The method of claim 8 further comprising the step of:
   generating a high-biased histogram based on said information in said database, wherein said information comprises a count value associated with an item, wherein said count value is a function of the adjusted threshold value.

* * * * *